Feb. 5, 1963   A. F. HOLDEN   3,076,605
CONTROL SYSTEM FOR LUMINOUS WALL FURNACE
Filed Aug. 3, 1959   4 Sheets-Sheet 1

INVENTOR.
ARTEMAS F. HOLDEN
BY
Farley, Forster + Farley
ATTORNEYS

United States Patent Office 3,076,605
Patented Feb. 5, 1963

3,076,605
CONTROL SYSTEM FOR LUMINOUS WALL
FURNACE
Artemas F. Holden, 2195 S. Milford, R.R. 1,
Milford, Mich.
Filed Aug. 3, 1959, Ser. No. 831,097
16 Claims. (Cl. 236—15)

This invention relates to a control system for industrial furnaces, and in certain aspects is particularly suited for use with a luminous wall furnace such as disclosed in my prior Patent No. 2,828,813 issued on April 1, 1958, wherein an air-gas mixture from a plenum chamber is delivered through a porous firebrick wall igniting and burning on the inner face of the wall to provide a luminous highly radiant form of heat.

The preferred embodiment of the present control system employs for fuel control the combination or subcombination of a radiant eye instrument for sensing the wall temperature of the furnace which, combined with a variable potentiometer, actuates an electrical control switch when a predeterminable temperature set point is reached, a thermocouple control which may be placed in fixed relation between the firing wall of the furnace and the work load, likewise combined with a variable potentiometer to actuate an electrical switch when a predeterminable temperature set point is reached, and a timer cycle control operating independently of furnace temperature to furnish a fractional portion of total fuel requirements with an intermittent gas flow to the plenum chamber in variable brief cycles which may be in the order of 3 to 6 seconds on and 3 to 6 seconds off. A manually selectively variable control switch is provided for placing either the radiant eye or the thermocouple, or both controls in series to actuate a normally open main solenoid valve regulating the gas flow to the furnace plenum chamber and for combining therewith the timer cycle control which actuates an auxiliary solenoid gas supply valve. The timer control is preferably actuated in combination with the radiant eye position of the selector switch, or with the thermocouple control position of the selector switch. Air is preferably supplied to the plenum chamber continuously in all selector positions of the control system but may be controlled on-off with the gas under certain conditions as will be later explained.

The control system is adaptable for use in multiple zone installations requiring separate temperature controls. In many of such installations it may be possible to use a single timer control common to all zones while having individual radiant eye and/or thermocouple controls for each of the various zones.

The advantages of this combination of controls and the various ways in which they may be employed will be more apparent from the following detailed description of a preferred embodiment with reference to the drawings wherein:

FIGURE 5 is a switch diagram showing alternative selective positions.

Figure 1:
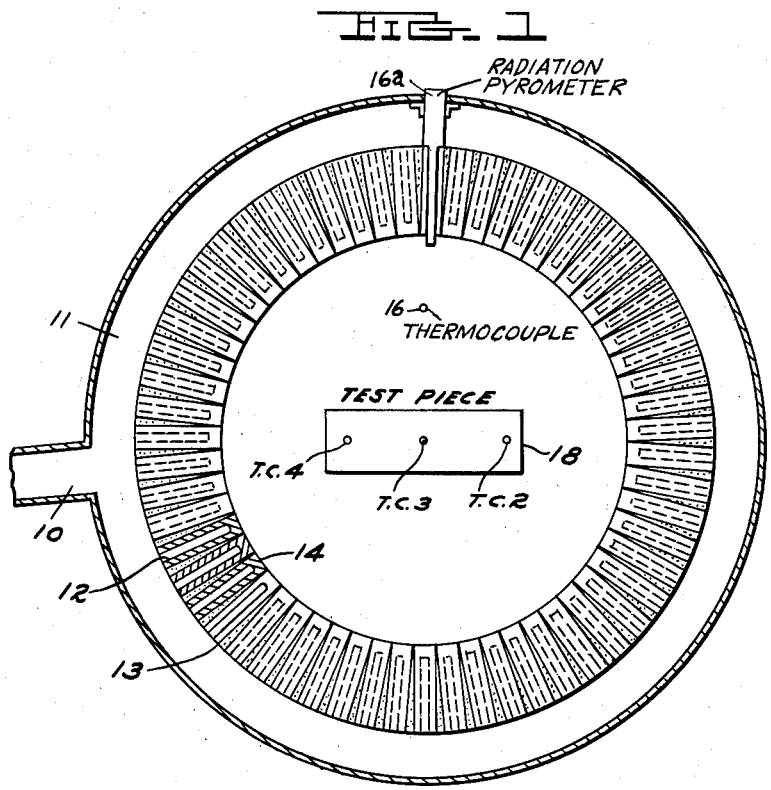
FIGURE 1 is a schematic plan view of a cylindrical furnace employed for test purposes showing location of a test piece and a control thermocouple.

Referring to FIGURE 1, the illustrated test furnace construction is substantially self-explanatory—the gas-air mixture, or air alone when the gas is shut off being fed from a mixer tube 9 (FIGURE 3) to the inlet 10 of the furnace plenum chamber 11, and through drilled passages 12 in the porous firebrick furnace wall 13 to within approximately 1 inch of the inner face of the firebrick from which is disperses through the remaining porous wall to the firing surface 14 where it is ignited and burns heating the firing surface to a luminous highly radiant heating condition. A control thermocouple 16 is located at an intermediate position between the firing face and the test piece 18 and a radiation eye instrument 16a is adapted to provide a control responsive to furnace wall temperature. The test piece and the position of various test piece temperature recording thermocouples T.C.2, T.C.3 and T.C.4 are also indicated.

Figure 2:
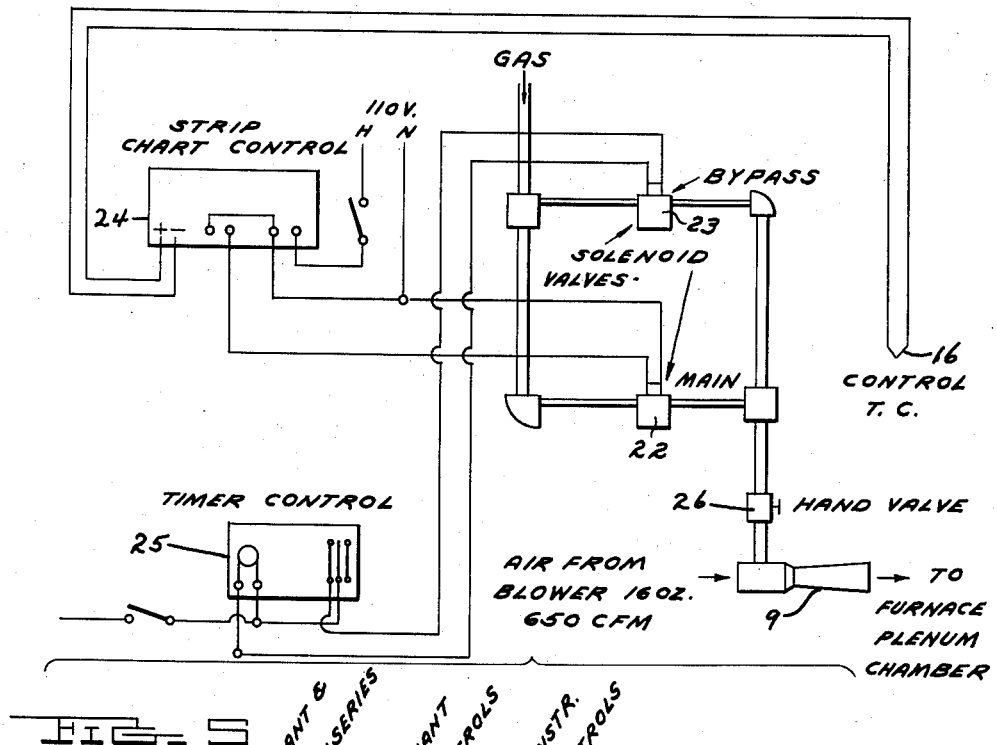
FIGURE 2 is a schematic view of the furnace control system using a control thermocouple with a strip chart controller, and an independent timer control.

The bottom of the furnace is provided with a cooling air inlet, not shown, controlled separately of the furnace control system illustrated in FIGURE 2.

In this system, air from a blower, not shown, is supplied continuously to the mixer tube 9 to which gas is supplied through a normally open main solenoid valve 22 and operated by the control thermocouple 16 and a strip chart control 24, and through an auxiliary bypass solenoid valve 23 operated by a timer control 25. A hand valve 26 is located in the common line from the solenoid valves 22 and 23 to the mixer tube 9.

Figure 3:
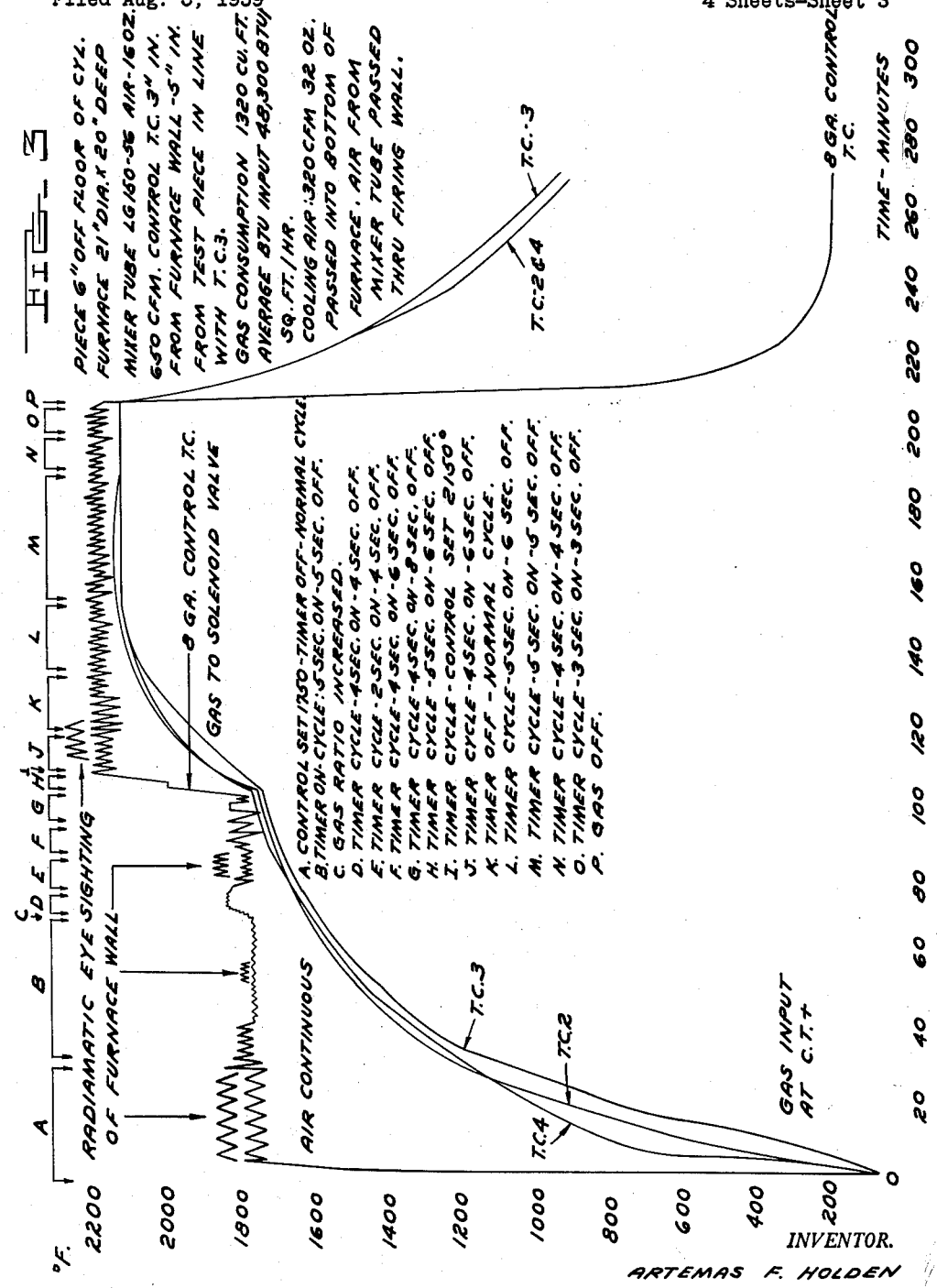
FIGURE 3 is a temperature versus time diagram for a typical test run showing temperature curves of the control and test piece thermocouples during a typical test cycle.

Referring to the test cycle illustrated in FIGURE 3, the initial firing was made with the control thermocouple set at 1750 degrees Fahrenheit and the timer off. The furnace temperature indicated by the control T.C. curve illustrates the normal action of a conventional control system through the initial time band A. At the beginning of B, the timer was turned on with a cycle of 5 seconds on, 5 seconds off, illustrating the smoothing action of the timer when combined with the thermocouple control. At the end of B, the gas ratio was increased causing a rise in temperature due to the fact that with the increased gas ratio, the timer cycle of 5 seconds on and 5 seconds off was more than sufficient to sustain the 1750° temperature. A change in the timer cycle from 4 seconds on to 4 seconds off at D did not materially reduce the temperature but when the timer cycle was changed to 2 seconds on and 4 seconds off at E, the temperature returned to 1750° with a slightly wider swing than in the minimum swing area B. At F, the timer cycle was changed to 4 seconds on and 6 seconds off producing a higher temperature and wider swing. At G, the timer cycle was changed to 4 seconds on and 8 seconds off returning substantially to the same temperature and swing as in the case of E with 2 seconds on and 4 seconds off. At H and I, the timer cycle was changed to 5 seconds on and 6 seconds off with the control thermocouple set point raised to 2150°, and at J, the timer cycle was changed to 4 seconds on and 6 seconds off where it is seen that the timer resumed control with a somewhat wider swing than in the case of the lower 1750° temperature. The smoothing action of the timer can again be seen in relation to K where the timer was turned off and the temperature swing increased under the regulation of the control T.C. alone. At L, the timer was again turned on at 5 seconds on and 6 seconds off showing a resumed smoothing action, while at M, the timer cycle was changed to 5 seconds on and 5 seconds off; at N, to 4 seconds on and 4 seconds off; and at O, to 3 seconds on and 3 seconds off with no material change in smoothing action. At P, the gas was turned off and cooling air introduced at the bottom of the furnace together with the continued air from the mixer tube 9 passing through the firewall produced a rapid drop in temperature at the control thermocouple as well as a drop in the temperature of the test piece thermocouples. While the temperature control was entirely under the control thermocouple and independent timer control during this test run, occasional radiomatic eye sighting of the furnace wall indicates a comparable temperature swing at a slightly higher level.

Figure 4:
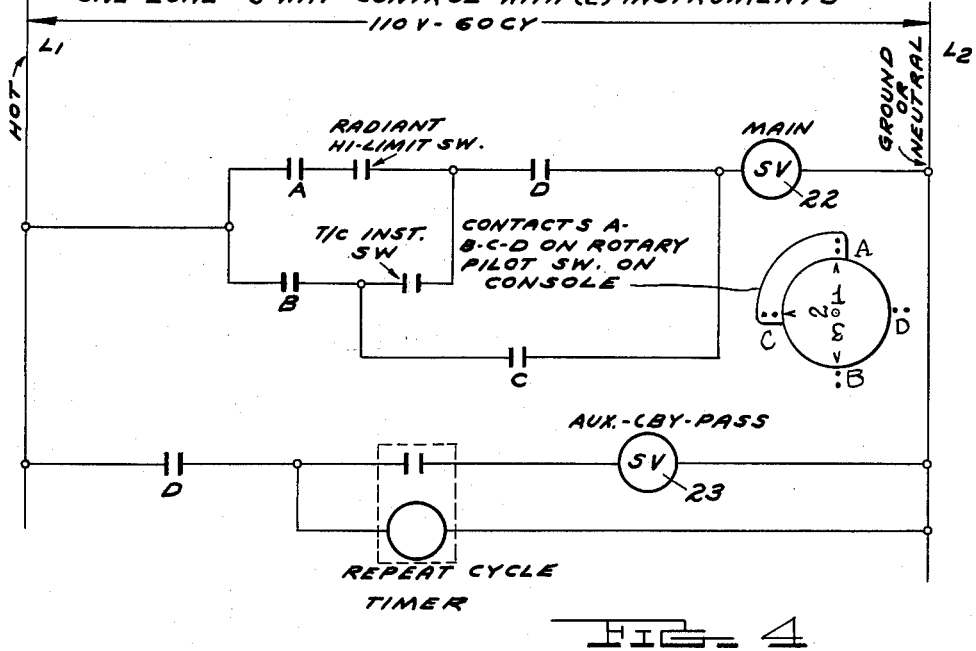
FIGURE 4 is a schematic circuit diagram showing both a radiant eye and control thermocouple adapted to control the main solenoid valve of the furnace control system shown in FIGURE 3.

For maximum flexibility and sensitivity of temperature control, a radiation or radiant eye instrument responsive to the temperature of the furnace firing wall was adapted to alternately control the main gas solenoid, as illustrated in FIGURE 4, and a manual pilot switch operating contacts A, B, C and D is provided to give the desired combination of radiant eye, thermocouple and independent timer control as shown in FIGURE 5. For example, with the manual switch in position #1, the thermocouple and radiation eye instruments are placed in series to control the main solenoid valve 22; in switch position #2, the radiation eye alone controls the main solenoid valve while the independent timer controls the auxiliary bypass solenoid valve 23; and in position #3, the thermocouple alone controls the main solenoid valve with the timer controlling the bypass solenoid valve.

Assuming that position #1 is used and that each of the radiant eye and control thermocouple instruments has the same set point, the main solenoid valve is actuated to turn off the gas supply when both the radiant eye and thermocouple temperatures are at or above the set point, and the gas flow is restored when either of the wall or thermocouple temperature falls below the set point. This setting would normally be employed after the work load is at temperature in order to maintain the furnace and work load at an accurate uniform level temperature. This combination control is more sensitive to heat requirement than either the radiant eye or thermocouple by itself since a drop in temperature at either the firewall source or internally spaced control thermocouple will open the gas valve.

Position #2, combining the radiant eye and timer control, is useful in bringing a load up to heat as rapidly as possible. The timer will operate to minimize wall cooling during off cycles of the radiant eye control and to smooth the temperature swing as in the case of the combination of timer and thermocouple control.

The flexibility of this system adapts it to multi-zone control wherein a single timer valve may supply a number of zones in combination with individual radiant eye or thermocouple controls for the respective zones.

At operating temperatures below 1200° it is unnecessary to maintain a continuous air supply to the mixer tube in which case a solenoid valve for turning the air supply on and off with the gas supply might be desired. However, at operating temperatures above 1200° it is desirable to maintain the air supply on continuously as a safety factor insuring against back heating and such continuous air supply is further a desirable feature in minimizing heat storage in the firewall and thereby minimizing cycle time where loads are successively heated and cooled in the same furnace.

While a preferred embodiment of the present invention has been described above in detail, it will be understood that numerous modifications might be resorted to without departing from the scope of this invention as defined in the following claims.

I claim:

1. In combination a luminous wall gas-fired furnace, a control system including a time cycle control for intermittently supplying in multiple on-off cycles per minute a portion of the fuel requirements independently of furnace temperature; and a furnace temperature responsive control for supplementing the fuel supplied by said timer control at furnace operating temperatures below a predeterminable set point.

2. A furnace and control system as set forth in claim 1 wherein said temperature responsive control is responsive to an interior furnace temperature at a location spaced from the firing wall.

3. A furnace and control system as set forth in claim 1 wherein said temperature responsive control is responsive to the temperature of said luminous furnace wall.

4. A furnace and control system as set forth in claim 3 further characterized by a second temperature responsive control responsive to an interior furnace temperature at a location spaced from the firing wall.

5. A furnace and control system as set forth in claim 4 including manually selective means for alternatively combining said time cycle control with either one or the other of said temperature responsive controls.

6. A furnace and control system as set forth in claim 5 wherein said manually selective means includes a position for combining said two temperature responsive controls in a manner whereby either will independently supply additional fuel when its respective temperature falls below a predeterminable set point.

7. A furnace and control system as set forth in claim 1 further characterized by means for supplying air continuously through the luminous wall of said furnace throughout the operation of said control system.

8. A control system for a furnace of the type having a heating element which burns a gas-air mixture comprising means for supplying gas-air mixture to a heating element at selected intermittent intervals in multiple on-off cycles per minute during the operation of a furnace independently of the temperature thereof, and simultaneously operable second means for supplying gas-air mixture to said heating element, said second supply means including a control element for rendering said second supply means operative in response to an interior furnace temperature below a predetermined selected set point.

9. A control system for a furnace having a heating element burning a gas-air mixture comprising means for supplying air to a heating element, said air supply means including a gas mixing device, means for supplying gas to said mixing device, said gas supplying means including a pair of valves, first control means for operating one of said valves in response to the temperature of a furnace, and simultaneously operable timer control means for selectively intermittently operating the other of said valves in multiple on-off cycles per minute independently of the temperature of said furnace.

10. A control system according to claim 9 wherein said first control means includes an element sensitive to the temperature of said furnace heating element.

11. A control system according to claim 9 wherein said first control means includes an element sensitive to a temperature taken adjacent a work load in said furnace.

12. A control system according to claim 9 wherein said first control means includes two temperature responsive elements, one of said elements being sensitive to the temperature of said furnace heating element and the other of said elements being responsive to a temperature taken adjacent a work load in said furnace.

13. A control system according to claim 12 further characterized by selector means for rendering either or both of said temperature responsive elements operative.

14. A temperature control system for a furnace having a heating element comprising a main fuel supply regulating device, an auxiliary fuel supply regulating device, first control means for operating said main regulating device in response to the temperature of a heating element, second control means for operating said main regulating device in response to a temperature taken adjacent a work load in a furnace, timer control means for intermittently operating said auxiliary regulating device in multiple on-off cycles per minute independently of the furnace temperature, and selector means for activating said first, second and timer control means in any one of the following combinations: (a) said first and second control means; (b) said first and timer control means; and (c) said second and timer control means.

15. A control system for a furnace having a heating element which burns a gas-air mixture comprising means for supplying a gas-air mixture to a heating element at intermittent intervals during the operation of a said furnace, said supply means including a source of air, a gas mixing device, means including a regulating valve for delivering gas to said mixing device, and means for intermittently operating said regulating valve in multiple on-off cycles per minute independently of the furnace temperature, second simultaneously operable means for supplying gas-air mixture to said heating element, said second supply means being responsive to any difference between an interior furnace temperature and a selected furnace temperature.

16. A control system according to claim 15 further characterized by said second supply means including a regulating device for controlling the gas delivered thereto, said regulating device being operable in response to said temperature difference.

References Cited in the file of this patent

UNITED STATES PATENTS

| | | |
|---|---|---|
| 1,667,001 | Gray | Apr. 24, 1928 |
| 1,844,959 | Hulse | Feb. 16, 1932 |
| 2,015,838 | Borden | Oct. 1, 1935 |
| 2,249,682 | Clark | July 15, 1941 |
| 2,262,609 | Keller | Nov. 11, 1941 |
| 2,527,430 | Kniveton | Oct. 24, 1950 |
| 2,556,081 | Hartman | June 5, 1951 |
| 2,594,206 | Payne | Apr. 22, 1952 |
| 2,656,172 | McGough | Oct. 20, 1953 |
| 2,664,283 | Hess | Dec. 29, 1953 |
| 2,801,799 | McColloch | Aug. 6, 1957 |
| 2,919,337 | Brosseau | Dec. 29, 1959 |

FOREIGN PATENTS

| | | |
|---|---|---|
| 279,084 | Germany | Oct. 9, 1914 |
| 353,550 | Great Britain | July 30, 1931 |